United States Patent
Rodenbeck et al.

(10) Patent No.: US 8,854,254 B2
(45) Date of Patent: Oct. 7, 2014

(54) ULTRA-WIDEBAND SHORT-PULSE RADAR WITH RANGE ACCURACY FOR SHORT RANGE DETECTION

(75) Inventors: Christopher T. Rodenbeck, Albuquerque, NM (US); Jeffrey Pankonin, Albuquerque, NM (US); Richard E. Heintzleman, Albuquerque, NM (US); Nicola Jean Kinzie, Albuquerque, NM (US); Zorana P. Popovic, Boulder, CO (US)

(73) Assignee: Sandia Corporation, Albuquerque, NM (US)

( * ) Notice: Subject to any disclaimer, the term of this patent is extended or adjusted under 35 U.S.C. 154(b) by 360 days.

(21) Appl. No.: 13/241,550

(22) Filed: Sep. 23, 2011

(65) Prior Publication Data

US 2013/0141270 A1 Jun. 6, 2013

Related U.S. Application Data

(60) Provisional application No. 61/434,780, filed on Jan. 20, 2011.

(51) Int. Cl.
*G01S 13/08* (2006.01)
*G01S 13/02* (2006.01)
*G01S 13/28* (2006.01)

(52) U.S. Cl.
CPC ........... *G01S 13/0209* (2013.01); *G01S 13/288* (2013.01)
USPC .............................. 342/137; 342/175; 342/85

(58) Field of Classification Search
CPC ....... G01S 13/227; G01S 13/20; G01S 13/22; G01S 7/282; G01S 13/106
USPC ............................. 342/70, 118, 128, 137, 202
See application file for complete search history.

(56) References Cited

U.S. PATENT DOCUMENTS

| | | | | |
|---|---|---|---|---|
| 5,146,616 | A * | 9/1992 | Tang et al. | 455/103 |
| 6,400,308 | B1 * | 6/2002 | Bell et al. | 342/71 |
| 7,369,598 | B2 * | 5/2008 | Fontana et al. | 375/130 |
| 2007/0109175 | A1 * | 5/2007 | Fukuda | 342/70 |
| 2011/0168891 | A1 * | 7/2011 | van der Weide et al. | 250/334 |

OTHER PUBLICATIONS

Gresham et al, "Ultra-Wideband Radar Sensors for Short-Range Vehicular Applications", IEEE Transactions on Microwave Theory and Techniques, vol. 52, No. 9, Sep. 2004, pp. 2105-2122.
Mahfouz et al, "Investigation of High-Accuracy Indoor 3-D Positioning Using UWB Technology", IEEE Transactions on Microwave Theory and Techniques, vol. 56, No. 6, Jun. 2008, pp. 1316-1330.
Azevedo & McEwan, "Micropower Impulse Radar", Science & Technology Review Jan./Feb. 1996, pp. 17-29.
Klotz & Rohling, "A 24 GHz Short Range Radar Network for Automotive Applications", Proceedings of 2001 CIE International Conference on Radar, 2001, pp. 115-119.
Lubecke et al, "Through-the-Wall Radar Life Detection and Monitoring", IEEE International Microwave Symposium Digest, 2007, pp. 769-772.

* cited by examiner

*Primary Examiner* — John B Sotomayor
*Assistant Examiner* — Marcus Windrich
(74) *Attorney, Agent, or Firm* — Scott B. Stahl

(57) ABSTRACT

An ultra-wideband (UWB) radar transmitter apparatus comprises a pulse generator configured to produce from a sinusoidal input signal a pulsed output signal having a series of baseband pulses with a first pulse repetition frequency (PRF). The pulse generator includes a plurality of components that each have a nonlinear electrical reactance. A signal converter is coupled to the pulse generator and configured to convert the pulsed output signal into a pulsed radar transmit signal having a series of radar transmit pulses with a second PRF that is less than the first PRF.

20 Claims, 3 Drawing Sheets

ULTRA-WIDEBAND SHORT-PULSE RADAR WITH RANGE ACCURACY FOR SHORT RANGE DETECTION

This application claims the priority under 35 U.S.C. §119 (e)(1) of co-pending provisional application Ser. No. 61/434,780 filed Jan. 20, 2011 and incorporated herein by reference.

This invention was developed under Contract DE-AC04-94AL85000 between Sandia Corporation and the U.S. Department of Energy. The U.S. Government has certain rights in this invention.

FIELD

The present work relates generally to short-pulse radar and, more particularly, to short-pulse radar for short range detection of high velocity targets.

BACKGROUND

Detection of radar targets at short range requires high range accuracy. The rms error in the range measurement is $\delta R = c/(2\beta_{eff}(2E/N_0)^{0.5})$, where c is the speed of light, $\beta_{eff}$ is the effective bandwidth of the radar signal, E is the signal energy, and $N_0$ is the noise power per unit bandwidth. The transmitted radar signal must therefore be wideband or high power to achieve high range accuracy. Three primary radar architectures are available for short range detection: linear frequency modulated (FM) pulse compression radar, frequency modulated continuous wave (FM-CW) radar, and short-pulse Doppler radar. In general, transmitters for pulse compression radar require more source components than FM-CW or the short-pulse Doppler implementations.

For each of the aforementioned architectures, the required peak transmit power increases as the length of the transmitted pulse decreases, in order to attain a constant average power. However, for short range requirements and wide bandwidths, the required peak transmit power is less than 1 W, even for a short-pulse system. The pulsed systems provide high levels of transmitter-to-receiver isolation because the transmitter and receiver do not operate simultaneously. On the other hand, the transmitter and receiver in a CW system are always on, leading to spillover, which must typically be mitigated.

Continuous wave radars theoretically do not have a minimum range, because both the transmitter and receiver operate continuously. Pulsed systems do have a minimum detectable range, because the receiver is not on when the transmitter is transmitting (i.e. to blind zones exist). As such, the minimum range of a pulsed system depends on the transmitted pulse width. This minimum range is shorter with short-pulse Doppler radar than with pulse compression radar.

The present work focuses on providing a wideband implementation of a coherent short-pulse radar transmitter that supports detection of targets at short range over a wide range of velocities.

DETAILED DESCRIPTION

Figure 1:
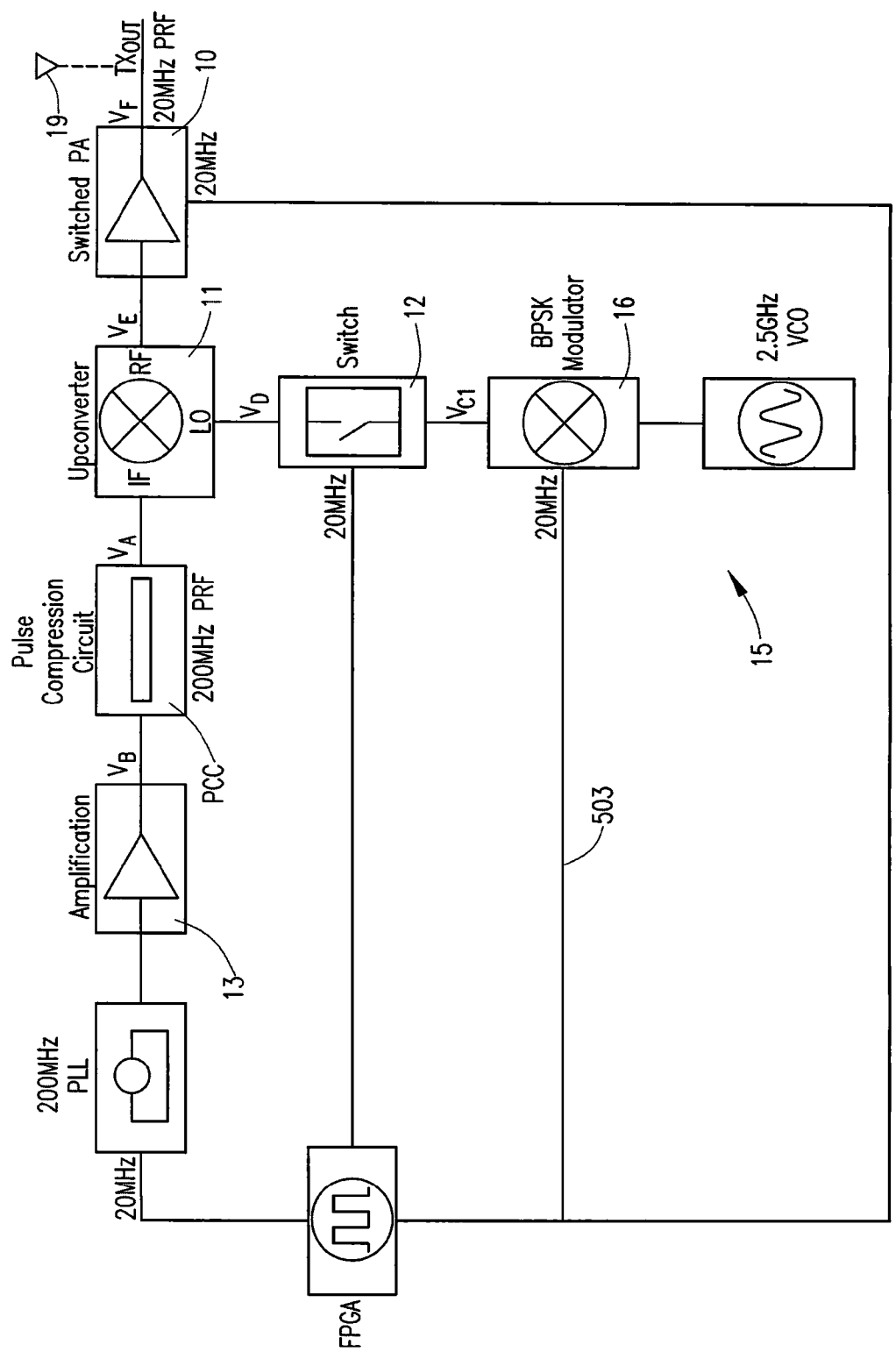
FIG. 1 diagrammatically illustrates a radar transmitter according to example embodiments of the present work.

The present work integrates ultra-wideband (UWB) techniques and coherent, pulsed transmission techniques to produce a coherent, short-pulse transmitter for a UWB pulse Doppler radar. The transmitted waveform facilitates unambiguous range and Doppler detection and allows for coherent processing by a UWB receiver. The transmit waveform may be designed to minimize the shortest range detectable by the receiver.

Example embodiments of the present work provide a transmitter having a to coherent short-pulse Doppler architecture that, in conjunction with an ultra-wideband receiver, facilitates the detection of targets at short ranges with at least 1.5 m accuracy for a single-pulse SNR around −13.5 dB. The short-pulse Doppler architecture may be implemented with relatively low-complexity source hardware, and provides a relatively low transmitter-to-receiver isolation requirement, as well as a relatively short detection range. Some embodiments detect moving targets at ranges less than 7 m. In some embodiments, the transmitter operates in a coherent, pulsed mode with a 10-dB pulse bandwidth of 1 GHz centered at 2.5 GHz (which corresponds to a 730 ns pulse envelope), and a pulse repetition frequency (PRF) of 20 MHz.

The PRF and the transmitted pulse width are important pulse Doppler radar parameters. The PRF determines the inherent range and Doppler ambiguities of the radar system, and pulse Doppler radars are therefore traditionally classified based on their PRF. High PRF pulse Doppler radars achieve unambiguous Doppler resolution for a single target using a $PRF \geq 2f_{D,max}$, where $f_{D,max}$ is the greatest expected Doppler shift. Low PRF pulse Doppler radars achieve unambiguous range resolution for a single target using a $PRF \leq c/(2R_{max})$, where c is the speed of light and $R_{max}$ is the maximum target range of interest. Normally, a high PRF results in highly ambiguous range results, and a low PRF results in highly ambiguous Doppler results. Multiple PRFs can be employed to resolve range and/or Doppler ambiguities at the cost of increased signal processing requirements and hardware complexity.

Unambiguous range and Doppler detection can be achieved simultaneously if $R_{max} f_{D,max} \leq c/4$, resulting in reduced hardware and signal processing requirements. To facilitate unambiguous detection, the transmitted PRF must be selected within the range $2f_{D,max} \leq PRF \leq c/(2R_{max})$. Setting the PRF near the upper limit of this range increases both the average transmitted power and the number of pulse returns in a given integration interval. This improves the radar detection probability. The ability to integrate many pulses is vital for accurate frequency measurement. For a Gaussian pulse envelope, the rms frequency error is $\delta f = 1.18/(\pi \tau (2E/N_0)^{0.5})$, where $\tau$ is the pulse width. Consequently, the shorter the pulse width, the greater the rms frequency error. To compensate, a coherent train of N received pulses can be integrated to improve the output SNR, the frequency resolution, and detection capability of the radar system.

As mentioned above, the transmitter and receiver of a pulse Doppler radar are normally never on simultaneously, resulting in a receiver blind zone when the transmitter is active. If the PRF is selected for unambiguous range detection, a blind zone will exist only for targets near the radar. Narrow transmit pulses may be used to minimize the blind zone. To keep the blind zone on the order of 1 m, the transmitted pulse must decay to a prescribed level within nanoseconds, suggesting a sub-nanosecond full-width half-maximum (FWHM) pulse width. In any radar system, an attenuated replica of the transmitted signal will leak from the transmitter to the receiver after a leakage delay time. This delayed replica signal extends the blind zone of the radar system. However, minimizing the pulse width of the transmitted signal helps minimize the shortest detectable range. Some embodiments of the present work use a sub-nanosecond pulse generator to provide a pulse width $\tau \leq 1$ ns.

UWB technology ($\geq 20\%$ 10-dB fractional bandwidth) has been used to implement a variety of short-pulse generators with sub-nanosecond pulses. Conventional UWB systems employ a variety of pulse generation circuit implementations, including CMOS and BiCMOS circuits, step recovery diode circuits, passive pulse-shaping circuits, and varactor diode circuits. A variety of signal shapes are available, including Gaussian pulses, Gaussian monocycles, square pulses, second-order Gaussian pulses, and triangular pulses. Such UWB systems are used in a variety of applications, including short range communications, localization, and ground penetrating radar. A short range UWB pulse Doppler radar has been developed for life sign detection, and various coherent UWB radar systems have been presented.

FIG. 1 diagrammatically illustrates a UWB transmitter with a coherent, pulsed topology according to example embodiments of the present work. In some embodiments, the radar operates at S-band to detect targets with a maximum range $R_{max}=7$ m and a to maximum target velocity of $v_{max}=3$ km/s with a worst case range accuracy of $\delta R=1.5$ m for a single-pulse SNR of around $-13.5$ dBm. A variety of free parameters remain, including: the PRF, the transmitted pulse width $\tau$, the carrier frequency $f_c$, the minimum peak transmitted power and the maximum off-state transmitted power $TX_{off,max}$. The carrier frequency is initially constrained to S-band and will be further constrained by the IF pulse bandwidth. In some embodiments, a pulse tagging scheme is employed to allow out-of-range target rejection. Examples of parameters for some embodiments are shown in Table I.

TABLE I

| Parameter | Symbol | Value |
| --- | --- | --- |
| Maximum target range | $R_{max}$ | 7 m |
| Minimum range measurement accuracy | $\delta R$ | 1.5 m |
| Pulse repetition frequency | PRF | 20 MHz |
| 3-dB pulse width | $\tau$ | 730 ps |
| Carrier frequency | $f_c$ | 2.5 GHz |
| Minimum peak TX power, on state | $TX_{on,min}$ | 0.6 W |
| Maximum peak TX power, off state | $TX_{off,max}$ | 12 uW |
| Pulse tagging scheme | — | BPSK |
| 3-dB bandwidth | $\beta$ | 610 MHz |
| 10-dB bandwidth | — | 1 GHz |
| Minimum transmitter on-off isolation | $\dfrac{TX_{on,min}}{TX_{off,max}}$ | 55 dB |

In some embodiments, the PRF is selected to facilitate unambiguous range detection up to 7 m. Some embodiments use a 20 MHz transmitted PRF, which provides unambiguous Doppler detection up to 10 MHz.

For a pulse width $\tau \leq 1$ ns, a pulse compression circuit (PCC) must generate sub-nanosecond pulses at a rate of PRF=20 MHz or, alternatively, at a rate that can be adjusted to 20 MHz. Some embodiments use a Gaussian pulse envelope because it falls off smoothly in both the time and frequency domains, making it simpler to transmit than, for example, a rectangular or triangular pulse. In some embodiments, the output $V_A$ of the PCC of FIG. 1 is a train of Gaussian-like 730 ps FWHM pulses with a PRF of 200 MHz.

In some embodiments, the 3-dB and 10-dB bandwidths of the PCC output are respectively 610 MHz and 1 GHz. These parameters dictate the minimum bandwidth for the upconverter 11 and the RF branch of the transmitter. The components following the PCC provide a flat response in gain, return loss, and group delay over the pulse bandwidth to avoid distorting the pulse envelope. In addition, the 10-dB bandwidth of the pulse limits the range of available center frequencies $f_c$ to 2.5 GHz$\leq f_c \leq$ 3.5 GHz. In some embodiments, $f_c$=2.5 GHz, to take advantage of the selection of commercially available components that operate in the 2-3 GHz octave band. For a 2.5 GHz center frequency, the LO and RF ports of the upconverter 11 operate from approximately 2-30 Hz, and the IF port of upconverter 11 operates up to about 500 MHz. As described in detail hereinbelow, the output power of the PCC imposes a constraint on the compression point of the upconverter 11.

The peak transmitted power must be high enough to meet minimum signal detection criteria. For example, with minimum single-pulse SNR around $-13.5$ dB, a channel attenuation of 114 dB, a receiver noise figure of 4.5 dB and a receiver bandwidth of 2 GHz, the minimum peak transmitted signal power, designated by $TX_{on,min}$, should be 0.6 W. The maximum peak transmitted power when the transmitter is in its off state, designated by $TX_{off,max}$, to prevent false alarms due to antenna leakage. In some embodiments, the minimum desired transmitter on-off isolation is $TX_{on,min}/TX_{off,max}$=55 dB. The example of $TX_{on,min}$=0.6 W thus requires $TX_{off,max}$=12 uW.

To produce the desired transmitted PRF of 20 MHz from the 200 MHz PRF of the pulse train output from the PCC at $V_A$ in FIG. 1, the PRF at $V_A$ must be reduced (down-sampled) by a factor of 10. A LO (local oscillator) branch 15 includes a high frequency switch 12 to implement the PRF reduction, and a voltage-controlled oscillator (VCO) which generates the carrier for the transmitter. The LO branch also generates the to carrier for the transmitter. Some embodiments provide a phase code modulator 16 that implements phase code pulse tagging to provide for distinguishing between in-range and out-of-range targets. The use of phase code modulators for pulse tagging is known in the art.

FIG. 1 provides a simplified illustration of the LO branch 15. Various intermediate components of the LO branch 15, which are omitted in FIG. 1, are described hereinbelow and shown in FIG. 5.

The RF branch of the transmitter includes a switched power amplifier (also denoted "switched PA") 10 that amplifies the upconverted signal $V_E$ so the peak output power is at least $TX_{on,min}$=0.6 W. The switched PA 10 also provides on-off transmitter isolation to ensure that the off-state power does not exceed $TX_{off,max}$=12 uW. The switched PA 10 drives a transmit antenna arrangement 19 as shown diagrammatically in FIG. 1.

A field programmable gate array (FPGA) in FIG. 1 provides various timing control signals. These signals, generated from a single crystal to ensure synchronous detection capabilities, are used throughout the transmitter of FIG. 1, and in the receiver (not shown in FIG. 1) as well. Timing synchronization is vital in pulsed systems for implementing range gating in the receiver, sampling the receiver output, and de-correlating the received phase-coded signal. Some embodiments utilize a Virtex-5 FPGA commercially available from Xilinx, Inc. In some embodiments, the outputs of the FPGA are buffered through a FIN1002 driver (commercially available from Fairchild Semiconductor Corporation) to a 50Ω load.

Figure 2:
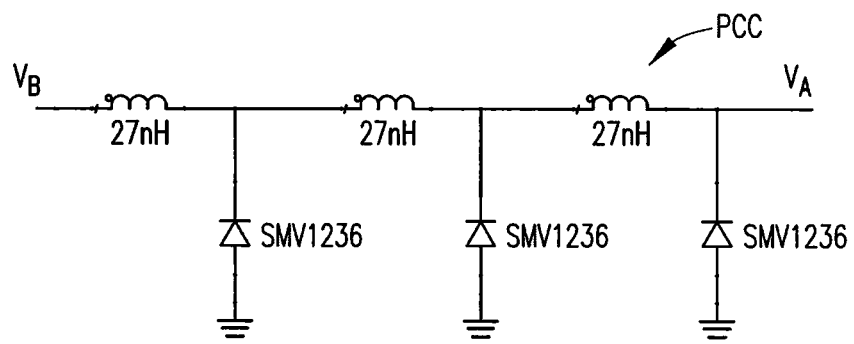
FIG. 2 diagrammatically illustrates the PCC of FIG. 1 in more detail according to example embodiments of the present work.

FIG. 2 diagrammatically illustrates the PCC of FIG. 1 in more detail according to example embodiments of the present work. The PCC takes a 200 MHz sinusoidal input $V_B$ and produces at $V_A$ a train of positive baseband pulses with a PRF of 200 MHz. The PCC of FIG. 2 is generally configured according to a discrete nonlinear transmission line (NLTL) pulse generator model. The NLTL model differs from the standard distributed transmission line model in that either the inductors or the capacitors have a nonlinear reactance. The example of FIG. 2 provides components with nonlinear capacitance in the form of varactor diodes, e.g., SMV1236 varactor diodes commercially available from Skyworks Solutions, Inc. The varactor diodes conduct when forward biased, providing a low impedance path to ground. As a result, when the input is voltage at $V_B$ is sufficiently negative to turn the diodes on, the input power is reflected, and the output voltage at $V_A$ is approximately 0V.

When the varactor diodes are reverse biased, they behave as variable capacitors, and the PCC can be approximated as a finite, nonlinear, lumped element transmission line. Similar to an infinite, continuous, linear transmission line, the phase velocity of an infinite, continuous, NLTL varies as $v_{ph}(V_R)=1/\sqrt{LC(V_R)}$, where $v_{ph}$ is the phase velocity, and $V_R$ is the reverse bias voltage of the varactor diodes. L is the inductance, and $C(V_R)$ is the variable capacitance, both corresponding to reactances per unit length of line. For the PCC, which is a finite, discrete approximation of a transmission line, the expression for phase velocity must be adapted. However, the adapted phase velocity remains proportional to the original expression as:

$$v_{ph}(V_R)_{adapted} = f(\kappa)\sqrt{\frac{1}{LC(V_R)}} \quad (1)$$

where $f(\kappa)$ is a function of the wave number and describes a weak dispersion relation. The capacitance of the SMV1236 hyperabrupt varactor diode decreases with increasing reverse bias. The inductance remains constant as indicated in FIG. 2. Therefore, the phase velocity increases with increasing reverse bias. As a result, when a sine wave is applied to the PCC, the positive half-cycle will be compressed to form a positive voltage pulse.

If the dispersion of an NLTL balances the nonlinearity of the line, a solitary wave will develop. The PCC output will be similar and can be approximated by the solution solution, as follows:

$$V_A(t) \simeq \sum_{n=1}^{\infty} V_{max}\mathrm{sech}^2\left(\frac{1.763(t - nT_D)}{\tau'}\right) \quad (2)$$

where $V_{max}$ is the maximum voltage, n is an integer, $T_D$ is the period of the input sinusoid, and $\tau'$ is the FWHM pulse width of the voltage pulse. Often UWB pulses are approximated as Gaussian. By comparing the following Taylor expansions $$\mathrm{sech}^2(cx) \simeq 1 - c^2x^2 + \frac{2c^4}{3}x^4 \quad (3)$$

$$\exp(-c^2x^2) \simeq 1 - c^2x^2 + \frac{c^4}{2}x^4 \quad (4)$$

it can be seen that the output of the PCC can be further approximated as $$V_A(t) \simeq \sum_{n=1}^{\infty} V_{max}\exp\left(-a\left(\frac{t-nT_D}{\tau'}\right)^2\right) \quad (5)$$

where "a" is a constant. For a Gaussian pulse, $a=4\ln(2)\approx1773$, and from Equations 2-4, a=3.103, which is within 15% of the theoretical Gaussian coefficient. The pulse width of the power signal is of interest, and Equation (5) can be rewritten as follows:

$$V_A(t) \simeq \sum_{n=1}^{\infty} V_{max}\exp\left(-\frac{a}{2}\left(\frac{t-nT_D}{\tau}\right)^2\right) \quad (6)$$

where $\tau$ is the FWHM pulse width of the power pulse. The output of the PCC is Gaussian-like, and the relationship between the pulse width and bandwidth of the PCC is as follows:

$$\tau\beta = \frac{4}{\pi}\ln\left(\frac{1}{\sqrt{0.5}}\right) \simeq 0.44 \quad (7)$$

where $\beta$ is the FWHM bandwidth of the pulse.

The SMV1236 varactor diode provides a wide range of capacitances (3.5-25 pF at 1 MHz) and allows for voltages up to 15V across the diode. In some embodiments, the PCC operates with input sinusoidal excitation amplitudes up to 6V peak (0.36 W) without exceeding the reverse breakdown voltage. A high peak input voltage provides a correspondingly high output voltage, thus reducing the gain requirement for the switched PA 10 of FIG. 1. Approximating the input impedance as $Z_{in}\approx(L/C)^{0.5}$, some embodiments use the illustrated 27 nH inductance value in order to provide a 50Ω input impedance for the mid-range reverse bias level (2V). As the input voltage deviates from 2V, both the input and output of the PCC are mismatched. The worst case mismatch occurs when the varactor diodes are conducting and the PCC input is a short, resulting in a complete mismatch to 50Ω.

The varactor diodes and inductors of FIG. 2 set the corner frequency of the PCC to $f_c=1/(\pi\sqrt{LC(V_R)})$. For an impulse compression NLTL, the corner frequency should lie just beyond the harmonic content of the output signal. The corner frequency is 600 MHz for the example of $V_R=2V$. The example input frequency of 200 MHz is a compromise between input pulse width and frequency roll-off. Higher input frequencies result in narrower pulses, but the low pass properties of the line limit the upper frequency range.

Figure 3:
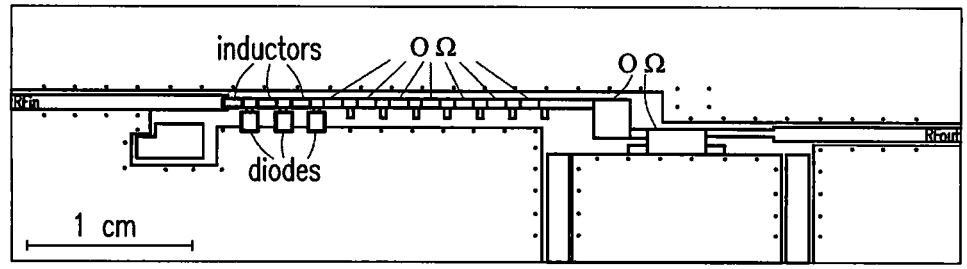
FIG. 3 diagrammatically illustrates an example of fabrication of the PCC of to FIG. 2.

In some embodiments, the PCC is fabricated on an FR4 substrate as shown in FIG. 3, and accommodates up to 10 LC sections and an optional output matching network or SOIC-8 packaged component. The PCC design in some embodiments allows the flexibility to select a peak RF input voltage from approximately 2-4V and a DC bias from 500-1000 mV, resulting in peak output voltages from 2.5-6V for the example 3-section architecture shown in FIGS. 2 and 3. The input signal not only impacts the peak amplitude but also the output pulse shape. The output pulse width, τ, ranges from 1100-600 ps over the 2-4V input range, and the pulse shape deviates from the Gaussian approximation in Equation (6) as the RF and DC voltage levels are increased.

Figure 4:
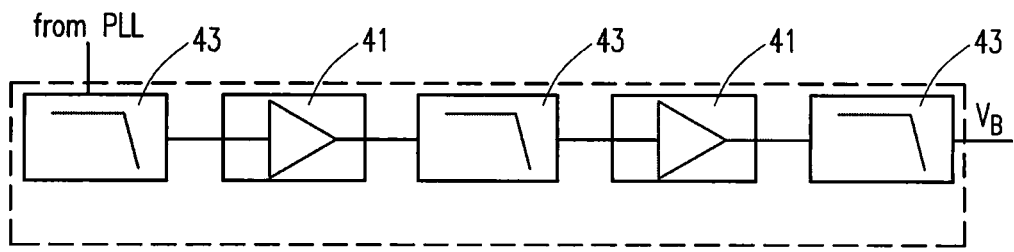
FIG. 4 diagrammatically illustrates the amplification stage of FIG. 1 in more detail according to example embodiments of the present work.

Referencing again the example of FIG. 1, the FPGA provides a 20 MHz TTL timing signal that drives a 200 MHz phase locked loop (PLL), which in turn drives an amplification stage 13 provided upstream of the PCC. In some embodiments, the PLL is implemented with the ADF4360-8, commercially available from Analog Devices, Inc., programmed at −19 dBm The amplification stage 13 provides a 200 MHz sinusoid at $V_B$, which is input to the PCC. As shown in FIG. 4, some embodiments of the amplification stage 13 use gain blocks 41 (e.g., HMC482ST39 commercially available from Hittite Microwave Corporation) to provide linear amplification to a desired output (19.6 dBm in some embodiments) at $V_B$. In some embodiments, the gain blocks 41 are broadband (DC-5 GHz) and provide reasonable reverse isolation (≥20 dB each) for the fundamental tone and the harmonics generated by the PCC. The gain blocks 41 are provided in a series configuration, interleaved among three low-pass filters 43. In some embodiments, the filters 43 have a 300 MHz cut-off frequency. The output $V_B$ of the amplification stage 13 may be expressed as $$V_B(t) = B\cos(\omega_{IF}t).$$

In some embodiments, B=3V and $f_{IF} = \omega_{IF}/2\pi = 200$ MHz.

Figure 5:
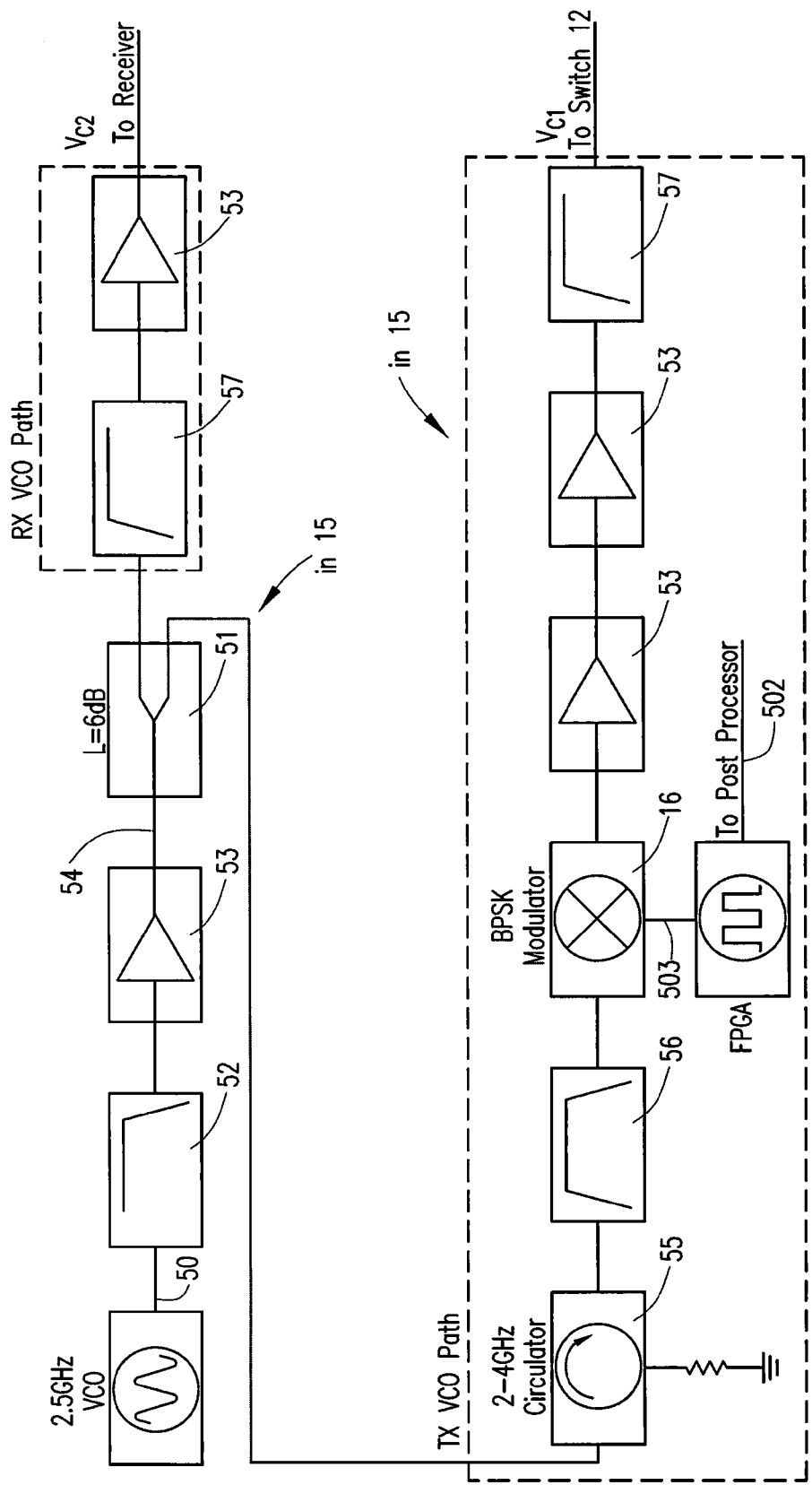
FIG. 5 diagrammatically illustrates the local oscillator branch of FIG. 1 in more detail according to example embodiments of the present work.

Referencing again FIG. 1, in some embodiments, the VCO operates at 2.5 GHz, and is implemented with the SMV2560A VCO commercially available from Z Communications, Inc. The VCO is the driver of the LO branch 15, shown in simplified form in FIG. 1, FIG. 5 diagrammatically illustrates further details of the LO branch 15. The 2.5 GHz LO signal 50 provided by the VCO is low-pass filtered at 52 (cut-off frequency of 3 GHz in some embodiments) and buffered by a (e.g., 15 dB) gain block 53 to provide a suitable carrier frequency, as is known in the art. The carrier frequency 54 is power-divided at 51, and then suitably processed to provide coherent signals $V_{C1}$ and $V_{C2}$ for the transmitter and the receiver, respectively. Some embodiments use a resistive power divider at 51, and implement the gain block 53 with the aforementioned Hittite HMC482ST39.

The power divider 51 drives a transmitter (TX) VCO path 50 and a receiver (RX) VCO path. In some embodiments, the power splitter 51 provides 6 dB nominal power splitting. The TX and RX VCO paths must be isolated from one another due to the operation of the switch 12 of FIG. 1, and also due to the aforementioned phase coding (applied by the phase code modulator 16 in the TX VCO path). In the time domain, the phase code appears as a 180° phase shift and, in the frequency domain, as frequency spreading around the 2.5 GHz tone. If the phase code leaks into the RX VCO path, the signal acquired at the receiver will be de-correlated, thus hindering the receiver's ability to discriminate between in-range and out-of-range targets. As explained in more detail below, the switch 12 turns the VCO signal of and on at a rate of 20 MHz. Accordingly, its frequency-domain output is a sine function centered at 2.5 GHz with additional frequency components spaced at 20 MHz. If these additional frequency components leak into the RX VCO path, then the down-converted signal processed at the receiver will not be the expected baseband, Doppler-shifted version of the PCC output signal.

Isolation between the TX and RX VCO paths is improved by providing a conventional circulator 55 and filters 56 (bandpass from 2-2.9 GHz in some embodiments) and 57 (high-pass with cut-off at 2 GHz in some embodiments) in the TX VCO path, and a further instance of filter 57 in the RX VCO path. Additional isolation is provided by three further gain blocks 53, two connected in series in the TX VCO path, and a third provided downstream of filter 57 in the RX VCO path.

As mentioned above, some embodiments apply a pseudo-random phase code to the transmitted pulses to provide for discrimination between in-range and out-of-range targets. In some embodiments, the phase code is generated by the FPGA using a maximum-length 28-bit linear feedback shift register (LFSR, not explicitly shown). The output of the LFSR transitions with each cycle a 20 MHz clock, i.e., at every transmitter pulse repetition interval. As shown at 502 in FIG. 5, a copy of the phase code produced by the FPGA is provided for use in post-processing (after reception of the reflected pulses at the receiver). Because the LFSR is maximum-length, the post-processing will be able to distinguish between an in-range target return and the first $2^{28}-1$ out-of-range target returns before the phase code sequence begins to repeat itself. The FPGA buffers the phase code (e.g., a BPSK code), and provides it at 503 to the phase code modulator 16 (e.g., a BPSK modulator). In some embodiments, the phase code modulator 16 is implemented with the HMC135 bi-phase modulator commercially available from Hittite Microwave Corporation. The buffered phase code 503 is input to the IF port of the HMC135.

The output $V_{C1}$ of the TX VCO path may be expressed as $$V_{C1}(t) = C_1\cos(\omega_c t)V_{pc}(t)$$

$$V_{pc}(t) = \sum_{m=1}^{\infty} C_{pc,m} rect\left(f_{sw}t - \frac{m}{2f_{sw}}\right)$$

where, in some embodiments, $C_1=0.95V$, $f_{sw}=20$ MHz, and $C_{pc,m}=\pm 1$ based on the pseudo-random phase code.

Referring again to FIG. 1, the switch 12 is the first step in reducing the PRF from 200 MHz to 20 MHz. Some embodiments implement the switch 12 with a TGS2306-EPU switch commercially available from Triquint Semiconductor, Inc. In some embodiments, the switch 12 is controlled by 20 MHz, 10% duty cycle complementary signals generated by the FPGA. Some embodiments level shift these signals (not explicitly shown) using, for example, a FIN1002 LVDS 1-Bit High Speed Differential Receiver commercially available from Fairchild Semiconductor Corporation. The RF output $V_D$ of the switch 12 may be expressed as $$V_D(t) = \frac{V_{C1}(t)}{C_1}\begin{cases} D_{on} & \frac{l}{f_{sw}} < t < \frac{DC+l}{f_{sw}} \\ D_{off} & \frac{DC+l}{f_{sw}} < t < \frac{l+1}{f_{sw}} \end{cases}$$

where, in some embodiments, $D_{on}$ is 0.65V, $D_{off}$ is 0.1V, l is a positive integer, and DC is the duty cycle (DC=0.1). The voltage level of $D_{on}$ turns on the upconverter 11, and the voltage level of $D_{off}$ is below the LO input threshold of the upconverter, effectively turning it off. As a result, the switch 12 switches the upconverter 11 on and off. With the output $V_A$ of the PCC providing the IF input to the upconverter 11, the switch 12 effectively switches the PCC on and off. The timing control signals at 20 MHz cause the switch 12 to select 1 out of every 10 PCC output pulses, thus down-sampling the PCC output pulse train at $V_A$ to achieve the desired 20 MHz PRF at the output $V_E$ of the upconverter 11. The TGS2306-EPU switch has sub-nanosecond rise and fall times, and is thus capable of generating nearly ideal, narrow (≤15 ns) pulse selection windows, without significant amplitude modulation of the VCO signal, and without significant distortion of the pulse envelope generated by the PCC.

Still referencing FIG. 1, the upconverter 11 is implemented in some embodiments with a mixer that up-converts the series of baseband pulses at $V_A$ to produce a signal suitable for transmission. The upconverter 11 performs the following: (1) cooperates with the switch 12 to reduce the pulse train. PRF from 200 MHz at $V_A$ to 20 MHZ at $V_E$; (2) cooperates with the VCO to modulate the radar transmit pulses onto the carrier; and (3) cooperates with the phase code modulator 16 to apply phase coding to the transmitted pulses. Thus, the LO branch 15, the switch 12 and the upconverter 11 together constitute a signal converter that produces, from the baseband pulse train at $V_A$, a radar transmit signal at $V_E$ that includes a series of phase coded radar transmit pulses.

The output $V_A$ of the PCC has significant frequency components (>−15 dBm) ranging from 200-1000 MHZ, and reflections from the upconverter 11 will distort the pulse envelope of the PCC. Some embodiments therefore implement the upconverter 11 with the HMC215LP4 mixer, commercially available from Hittite Microwave Corporation, which is well matched over the entire range. The HIMC215LP4 mixer also provides 8 dB±2 dB conversion loss over the entire S-band, so the up-conversion loss is flat over the 2-3 GHz bandwidth, thus avoiding distortion of the pulse envelope. In some embodiments, the PCC has a peak output voltage of 3.6V, The HMC215LP4 mixer is generally capable of handling this peak IF voltage without distorting the envelope of the output pulse, although its 17 dBm ($2.2V_p$) compression point is still relatively low. Therefore, an attenuator (not explicitly shown) is provided at the output of the PCC to ensure linear operation of the mixer. The output of the upconverter is given by $$V_E(t) = E(t) \frac{V_A(t)}{V_{max}} \frac{V_{C1}(t)}{C_1}$$

$$E(t) = \begin{cases} E_{on}; & \frac{l}{f_{sw}} < t < \frac{DC+l}{f_{sw}} \\ E_{off}; & \frac{DC+l}{f_{sw}} < t < \frac{l+1}{f_{sw}} \end{cases}$$

where $E_{on}$=0.9V and $E_{off}$=0.2V in some embodiments.

Figure 6:
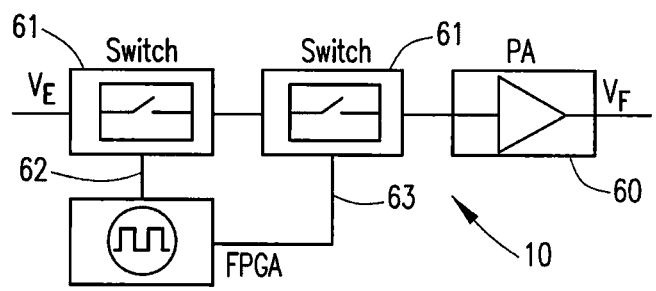
FIG. 6 diagrammatically illustrates the switching power amplifier of FIG. 1 in more detail according to example embodiments of the present work.

FIG. 6 diagrammatically illustrates the switched PA 10 of FIG. 1 in more detail according to example embodiments of the present work. A power amplifier (PA) portion 60 provides linear amplification of the upconverted pulse train, at adequate gain to achieve the example 0.6 W peak transmitted power level with ±1.5 dB gain flatness over the 2-3 GHz 3-dB bandwidth of the pulse train. In some embodiments, the PA portion 60 is implemented with the CA24-207 amplifier commercially available from to Ciao Wireless, Inc. Two series-connected RF switches 61 are provided upstream of the PA portion 60. The switches 61 are respectively controlled by two 20 MHz signals 62 and 63 (provided by the FPGA) which are temporally offset from one another suitably to provide transmitter on-off isolation in conventional fashion. The on-off isolation at the output of the upconverter 11 is 13 dB in some embodiments. Accordingly, to achieve the example target of 55 dB on-off isolation in Table I, the series-connected switches 61 should provide at least an additional 42 dB of on-off isolation. Some embodiments implement each switch 61 with the aforementioned TGS2306-EPU switch. The output of the switched. PA 10 may be expressed as $$V_F(t) = F(t) \frac{V_A(t)}{V_{max}} \frac{V_{C1}(t)}{C_1}$$

$$F(t) = \begin{cases} F_{on}; & \frac{l}{f_{sw}} < t < \frac{DC+l}{f_{sw}} \\ F_{off}; & \frac{DC+l}{f_{sw}} < t < \frac{l+1}{f_{sw}} \end{cases}$$

where $F_{on}$=7.7V and $F_{off}$=15 mV in some embodiments.

Although example embodiments of the present work are described above in detail, this does not limit the scope of the present work, which can be practiced in a variety of embodiments.

What is claimed is:

1. An ultra-wideband (UWB) radar transmitter apparatus, comprising:
   a pulse generator configured to produce from a sinusoidal input signal a pulsed output signal having a series of baseband pulses with a desired transmit pulse width at a first pulse repetition frequency (PRF), said pulse generator including a plurality of components that each have a nonlinear electrical reactance, wherein said pulse generator is constrained to provide said desired transmit pulse width at said first PRF; and
   a signal converter coupled to said pulse generator and configured to convert said pulsed output signal into a pulsed radar transmit signal having a series of radar transmit pulses with said desired transmit pulse width, but at a desired transmit PRF that is less than said first PRF.

2. The apparatus of claim 1, wherein said pulse generator is configured as a nonlinear transmission line (NLTL) pulse generator.

3. The apparatus of claim 2, wherein said components each have a nonlinear capacitance.

4. The apparatus of claim 3, wherein said components respectively include varactor diodes.

5. The apparatus of claim 1, wherein said components each have a nonlinear capacitance.

6. The apparatus of claim 5, wherein said components respectively include varactor diodes.

7. The apparatus of claim 1, wherein said signal converter includes a mixer coupled to said pulse generator, a local oscillator, and a switch coupled between said oscillator and said mixer.

8. The apparatus of claim 7, wherein said mixer is cooperable with said local oscillator to modulate said radar transmit pulses onto a carrier produced by said local oscillator, and wherein said mixer is cooperable with said switch to convert said first PRF of said baseband pulses to said desired transmit PRF of said radar transmit pulses.

9. The apparatus of claim 8, wherein said signal converter includes a phase code modulator coupled between said local oscillator and said switch, and cooperable with said mixer to apply phase coding to said radar transmit pulses.

10. The apparatus of claim 9, including a timing apparatus coupled to said pulse generator and said switch and said phase code modulator for synchronizing operations thereof.

11. The apparatus of claim 10, wherein said timing apparatus is configured to generate phase codes for said phase code modulator.

12. The apparatus of claim 9, wherein said phase code modulator includes a binary phase shift keying (BPSK) modulator.

13. The apparatus of claim 8, wherein said pulse generator is configured as a nonlinear transmission line (NLTL) pulse generator.

14. The apparatus of claim 1, wherein said desired transmit pulse width is a sub-nanosecond pulse width.

15. The apparatus of claim 1, wherein said first PRF is approximately 200 MHz and said desired transmit PRF is approximately 20 MHz.

16. The apparatus of claim 15, wherein said desired transmit pulse width is a sub-nanosecond pulse width.

17. An ultra-wideband (UWB) radar transmitter apparatus, comprising:
   a pulse generator configured to produce from a sinusoidal input signal a pulsed output signal having a series of baseband pulses with a desired transmit pulse width at a first pulse repetition frequency (PRF), said pulse generator including a plurality of components that each have a nonlinear electrical reactance, wherein said pulse generator is constrained to provide said desired transmit pulse width at said first PRF;
   a signal converter coupled to said pulse generator and configured to convert said pulsed output signal into a pulsed radar transmit signal having a series of radar transmit pulses with said desired transmit pulse width, but at a desired transmit PRF that is less than said first PRF; and
   a transmit antenna arrangement coupled to said signal converter for transmitting said radar transmit signal.

18. The apparatus of claim 17, wherein said pulse generator is configured as a nonlinear transmission line (NLTL) pulse generator.

19. The apparatus of claim 18, wherein said components each have a nonlinear capacitance.

20. The apparatus of claim 19, wherein said components respectively include varactor diodes.

* * * * *